(12) United States Patent
Zhang et al.

(10) Patent No.: US 6,904,972 B2
(45) Date of Patent: Jun. 14, 2005

(54) FRACTURING WITH VISCOELASTIC SURFACTANT BASED FLUID

(75) Inventors: Kewei Zhang, 5543 Dalhart Hill, NW., Calgary, Alberta (CA), T3A 1S8; Bill Oneil, Red Deer (CA)

(73) Assignee: Kewei Zhang, Calgary (CA)

( * ) Notice: Subject to any disclaimer, the term of this patent is extended or adjusted under 35 U.S.C. 154(b) by 0 days.

(21) Appl. No.: 10/275,295

(22) PCT Filed: May 3, 2001

(86) PCT No.: PCT/CA01/00597
§ 371 (c)(1),
(2), (4) Date: Mar. 31, 2003

(87) PCT Pub. No.: WO01/83946
PCT Pub. Date: Nov. 8, 2001

(65) Prior Publication Data
US 2003/0168217 A1 Sep. 11, 2003

(30) Foreign Application Priority Data

May 3, 2000 (CA) ............................................. 2307435
Dec. 22, 2000 (CA) ............................................. 2329600

(51) Int. Cl.$^7$ ............................................. E21B 43/17
(52) U.S. Cl. ........................ 166/308; 166/283; 507/202
(58) Field of Search ................................ 166/308, 309, 166/305.1, 283; 507/202, 240

(56) References Cited

U.S. PATENT DOCUMENTS 6,410,489 B1 * 6/2002 Zhang et al. ............... 507/202

* cited by examiner

Primary Examiner—John Kreck
(74) Attorney, Agent, or Firm—Stikeman & Elliott LLP; Eugene F. Derenyi

(57) ABSTRACT

A subterranean fracturing fluid, which is relatively harmless to both the environment and subterranean formations includes an amphoteric surfactant, specifically a betaine surfactant and an organic electrolyte or an alcohol in an aqueous medium. Depending upon the proportions of the ingredients, and fluid can be foamed.

26 Claims, No Drawings

FRACTURING WITH VISCOELASTIC SURFACTANT BASED FLUID

BACKGROUND OF THE INVENTION

1. Field of the Invention

This invention relates to a fracturing fluid and to a method of fracturing a subterranean formation to increase the permeability of the formation.

More specifically, the invention provides a foamed, viscoelastic surfactant based fracturing fluid for fracturing a subterranean formation and transporting proppant into thus created fractures.

2. Discussion of the Prior Art

Hydraulic fracturing has been used for many years to stimulate the production of petroleum from subterranean formations. In hydraulic fracturing, a fracturing fluid is injected through a wellbore into the formation at a pressure and flow rate sufficient to overcome the overburden stress and to initiate a fracture in the formation. Frequently, a proppant, whose function is to prevent the created fractures from closing back down upon itself when the pressure is released, is suspended in the fracturing fluid for transport into a fracture. Proppants in use include, for example 20–40 mesh size sand and ceramics, but the most common proppant is sand. The proppant filled fractures provide permeable channels allowing petroleum to seep through the fractures into the wellbore from whence it is pumped to the surface. Accordingly, a desired fracturing fluid should have the following properties: (a) compatibility with the reservoir rock and reservoir fluids, (b) be sufficiently viscous and have a fluid structure capable of suspending proppants and transport them deep into the formation, (c) be stable enough to retain sufficient viscosity and fluid structure throughout proppant placement, (d) possess low fluid loss properties and low fluid flow friction pressures, (e) be easily removed from the formation with little residue, (f) be easily made under field conditions and (g) be relatively inexpensive. Production of petroleum can be enhanced significantly by the use of specialized fracturing fluids, which exhibit high levels of rheological performance.

Fracturing fluids in common use include various aqueous gels and hydrocarbon gels. The gels are formed by introducing cross-linkable polymers or surfactants into an aqueous or hydrocarbon fluid, followed by cross-linking of the polymer or surfactant molecules. The cross-linking give the fluid high viscoelastic properties that are necessary to transport and place proppants into the fractures.

Another widely used fracturing fluid is formed, water-based fracturing fluid. Such a fluid is described, for example, in U.S. Pat. No. 3,980,136, issued to R. A. Plummer et al on Sept. 14, 1976. Briefly, the foamed fracturing process involves generation of foams with a desired quality which arc pumped through a wellbore into a formation. Typically, for aqueous systems, a polymer has to be hydrated in water at the surface before being pumped into the formation. The process of polymer hydration is time consuming and often requires bulky equipment at the wellsite. Another problem common to polymer-based fracturing fluids is that a significant amount of polymer residue is left in the formation resulting in negative impact on formation permeability.

Viscoelastic surfactants have long been used for well stimulation. A surfactant is a type of substance, which contains both hydrophobic and hydrophilic groups in the same molecule. The hydrophobic group is usually one of a variety of alkyl groups and the hydrophilic group can be ionic, which may be positive (cationic), negative (anionic) or contain both positive and negative moieties (amphoteric), or nonioni—often consisting of a neutral polyoxyalkylene group. When dissolved in an aqueous medium, surfactants generally form various aggregates called micelles above a critical micelle concentration (cmc). At low concentration of surfactant, the micelles usually are small and spherical. Under certain conditions and surfactant concentrations, however, the spherical micelles grow in size and/or change their shape resulting in the formation of long flexible micelles. Above a certain concentration the long flexible micelles can become entangled and exhibit strong visoelastic behavior. Even though this feature has been observed in a number of systems containing nonionic and anionic surfactants, the effect is more pronounced in cationic surfactants, especially those containing an amine or quaternary ammonium group, in the presence of certain organic counterions such as, for example salicylate, benzonate and alkyl sulfonate. Viscoelastic surfactant fluids have been studied extensively in recent years and have found a wide variety of uses in many applications.

U.S. Pat. No. 4,061,580, issued to R. W. Jahnke on Dec. 6, 1977 discloses surfactant gelled fracturing and acidizing fluids suitable for well stimulation. The gelled fluids are prepared by adding certain amine salts to aqueous acid or salt solutions. The amine salts used as thickeners are prepared by merely mixing one equivalent of amine per equivalent of acid or, in the case of polybasic acids such as sulfuric and phosphoric acids, as little as one-half equivalent of amine per equivalent of acid may be used resulting in the formation of an acidic salt. The aqueous acid or salt solution can be gelled by the addition of the above-described salts. For example, 15% by weight of HCl can be gelled by the addition of a small amount, usual 3–10% by weight and typically about 5% by weight of an amine or amine salt as described above. For fracturing fluids, aqueous solutions containing some inorganic salts can be gelled by the addition of 3–10% by weight, preferably about 5% by weight, of an amine salt described above. U.S. Pat. No. 4,163,727, issued to C. G. Inks on Aug. 7, 1979 discloses an acidizing-gel composition which consists essentially of, for example, about 15% by weight of HCl, about 20% by weight of a suitable nonionic gel-forming surfactant containing oxyethylene and oxypropylene units, a corrosion inhibitor to the extent needed, and the balance water.

U.S. Pat. No. 5,551,516, issued to W. D. Norman et al on Sept. 3, 1996 and U.S. Pat. No. 5,964,295, issued to J. E. Brown et al on Oct. 12, 1999 disclose a fracturing fluid composition comprising a quaternary ammonium salt, erucyl bis (2-hydroxyethyl) methyl ammonium chloride, an organic salt such as sodium salicylate, inorganic salts such as ammonium chloride and potassium chloride and water. The patents state that the fluid has good visoelastic properties and is easily formulated and handled. Furthermore, no or very little residue is left in a formation after the completion of the fracturing process. It is worth noting, however, that cationic surfactants such as amine and quatenary ammonium salts usually degrade very slowly, both aerobically and anaerobically, and moreover are highly toxic to marine organisms. The combination of low biodegradability and high toxicity is a fundamental criterion for a product injurious to the environment. In addition, cationic surfactants tend to rend the formation, especially sandstone formations, oil-wet absorbing on the surface of clays and sands. The alteration of the formation wettability often reduces the relative permeability of petroleum leading to high water/ petroleum ratio and low production rates. The strong adsorption of cationic surfactant on the clay and sands may also adversely affect fluid viscosity.

GENERAL DESCRIPTION OF THE INVENTION

Thus, there is a general demand for surfactants, which are less harmful to both the environment and to subterranean formations, but which have the same excellent ability as above-mentioned cationic surfactants to form visoelastic surfactant based fracturing fluids. An object of the present invention to meet this demand.

Another object of the present invention is to overcome the disadvantages inherent to existing fracturing fluids by providing a fracturing fluid having relatively good foaming capability and foam stability in a wide range of temperatures.

According to one aspect, the invention relates to a fracturing fluid comprising an aqueous medium, at least one betaine surfactant having a saturated or unsaturated alkyl or acyl group containing 14–24 carbon atoms and a member selected from the group consisting of (a) at least one organic electrolyte having the general formula

$R_1$-A wherein $R_1$ is a hydrophobic aliphatic or aromatic, straight or branched, saturated or unsaturated hydrocarbon group with 6–24 carbon atoms and A is a cationic, preferably monovalent group and (b) at least one alcohol having the general formula

$R_2$—OH wherein $R_2$ is a hydrocarbon group with 6–24 carbon atoms.

According to a second aspect, the invention relates to a method of fracturing a subterranean formation comprising the step of injecting a fracturing fluid into the formation at a pressure sufficient to initiate fracturing, said fluid including an aqueous medium, at least one betaine surfactant having a saturated or unsaturated alkyl or acyl group containing 14–24 carbon atoms and a member selected from the group consisting of (a) at least one organic electrolyte having the general formula

$R_1$-A wherein $R_1$ is a hydrophobic aliphatic or aromatic, straight or branched, saturated or unsaturated hydrocarbon group with 6–24 carbon atoms and may also contain one or two hydrophilic moieties, and A is a cationic preferably monovalent group, and (b) at least one alcohol having the general formula

$R_2$—OH wherein $R_2$ is a hydrocarbon with 6–24 carbon atoms.

DESCRIPTION OF THE PREFERRED EMBODIMENTS

As described above, the basic composition of the invention includes surfactant, and the organic electrolyte or alcohol which are all readily degradable. In addition, since betaine surfactants have strong foaming capability, the present composition also gives an excellent foaming capability and foam stability within wide temperature ranges, without employing additional foaming surfactants. The present fluid may also contain a gas, for example, $N_2$ or $CO_2$, and thereby be in the form of foams or energized fluids. In other words, the present fluid may also be utilized as a foamed water-based fracturing fluid in the presence of gas.

The betaine surfactant has a saturated or unsaturated alkyl or acyl group with 14–24 carbon atoms. When the surfactant is used with the organic electrolyte of the formula $R_1$-A, the generally molecular structure of the betaine surfactants is represented by the general formula

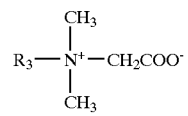

where $R_3$ is an alkyl group or the group $R'NHC_3H_6$, in which R' is an acyl group. The groups $R_3$ and R' can suitably be tetradecyl, hexadecyl, octadecyl, oleyl, rape seed alkyl and tallow alkyl or the corresponding acyl group.

As mentioned above the organic electrolyte has the general formula

$R_1$-A where $R_1$ is a hydrocarbon group with 6–24 carbon atoms and A is a cationic, preferably monovalent group. The hydrophobic group $R_1$ can be aliphatic or aromatic, straight or branched, saturated or unsaturated and may also contain one or two hydrophilic moieties The combination of the specific betaine surfactants and the organic electrolytes in an aqueous medium gives good visoelastic properties within a wide temperature range. The fluids according to the invention can also tolerate hard water and a high concentration of salt. The carbon numbers of the hydrophobic groups, $R_3$ R' and $R_1$ will determine the useful temperature range for a particular fluid so that high carbon numbers usually give products suitable for high temperatures.

When the betaine surfactant is used with an alcohol of the formula $R_2$—OH the general formula of the betaine surfactant is

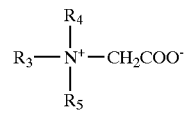

where $R_3$ has the above-defined meaning, and $R_4$ and $R_5$ are hydrocarbon aliphatic or unsaturated groups and may also contain one or two hydrophilic moieties, such as hydroxyl (—OH), or ethoxy or propoxy moieties. In the alcohol having the general structure

$R_2$—OH $R_2$ is a hydrocarbon group with 6–24 carbon atoms. The hydrocarbon groups $R_2$ can be aliphatic or aromatic, straight or branched, saturated or unsaturated. The combination of the specific betaine surfactants and alcohols in an aqueous medium also gives good visoelastic properties within a given temperature range. The carbon numbers of the hydrocarbon groups $R_3$ will determine the useful temperature range for a particular fluid so that high carbon numbers usually give products suitable for high temperatures.

When the surfactant is used in combination with an organic electrolyte, the preferred betaine surfactant is hexadecyl dimethyl betaine or octadecyl dimethyl betaine. Alternative betaines may be employed either alone or in combination, including rapeseed alkyl dimethyl betaine, oleyl, dimethyl betaine, tallow dimethyl betaine, myristyl dimethyl betaine. The preferred organic electrolyte is sodium salt of 3-hydroxy-2-Naphthalene carboxylic acid. Alternatives include sodium xylene sulphonate, sodium 3-hydroxy-2-sodium cumene sulphonate, sodium salicylate, sodium dodecyl benzene sulphonate, sodium toluene sulphonate, sodium toluate, sodium benzene sulphonate, sodium, hexadecylbenzenesulphonate, sodium phenyl phosphate, alkyl sulphates derived from fatty alcohols or synthetic alcohols, and alkylarenesulphonates such as decylsulphate, dodecylsulphate, cocoalkylsulphate, oleylsulphate, tallowsulphate. It is worth noting that it is the anions instead of the cations, of the organic electrolyte which promote the formation of the viseoelastic surfactant gel when mixed with the betaine surfactants in the aqueous medium.

When the surfactant is used with an alcohol, the preferred betaine surfactant is octadecyl dimethyl betaine. Alternative betaines may be employed either alone or in combination, including erucyl dimethyl betaine, docosyl dimethyl betaine, cetyl, dimethyl betaine, tallow dimethyl betaine, and myristyl dimethyl betaine The preferred alcohol is benzyl alcohol. Alternatives include decanol, dodecanol and hexadecanol.

By "aqueous medium" is meant that at least 50% by weight, preferably at least 90% by weight, of the water-based liquid system consists of water. Within the term are plain water and aqueous solutions of inorganic salts and aqueous alkaline or acidic solution. Other exemplary aqueous liquids include mixtures of water and water-miscible liquids such as lower alkanols, e.g., methanol, ethanol or propanol, glycols and polyglycols. Also included are emulsions of immiscible liquids in the aqueous liquids, aqueous slurries of solid particulates such as sands, ceramics, or other minerals and a number of conventional components such as clay stabilizers, antifreeze agents and bactericides. All of the additives, as well as the betaine surfactants, organic electrolytes and water, are employed in amounts that do not deleteriously affect the viseoelastic properties of the fluid.

The present invention is described below in greater detail by means of the following examples.

EXAMPLES

The foaming properties of the surfactant and organic electrolyte compositions according to the present invention were tested by a simple method involving the measuring of foam height and foam half-life. 200 ml of gel sample were placed in a 1 litre Waring blender jar, and mixed at maximum blender speed for 30 seconds. The resulting foam was poured into a 1000 ml graduated cylinder, and a timer started. The foam height is the maximum volume occupied by the foam, and can be used to calculate foam quality. The half-life is the time required for 100 ml of solution to accumulate in the bottom of the cylinder. For elevated temperatures, the sample, blender jar, and cylinder are heated to 10 C above the tested temperature for 15 minutes. In the following examples, the percentages are by weight and the viscosity is measured using a Brookfield viscometer (Model LVT, Spindle 1 at 12 rpm) at room temperature.

Example 1

0.50 g of N-hexadecyl dimethyl betaine having the formula

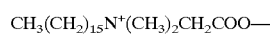

(hereinafter referred to as $C_{16}$-betaine or $C_{16}$-BET) was dissolved in 0.4 ml isopropanol (IPA) and then mixed with 200 ml of tap water. The resulting solution was mixed with 0.27 g of the sodium salt of dodecyl benzene sulphonate having the formula

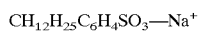

(hereinafter referred to as Na-LAS). A clear gel with high elasticity was formed. The gel was poured into a 1 litre Waring blender jar, and mixed at maximum blender speed for 30 seconds. The resulting foam was tested in the manner described above. The test results are listed in Table 1.

Example 2

0.50 g of $C_{16}$-BET was dissolved in 0.4 ml IPA, and then mixed with 200 ml of 7.0 wt % of aqueous KCl solution. The resulting solution was mixed with 0,.098 g of the sodium salt of 3-hydroxy-2-naphthalenecarboxylic acid, $C_{10}H_6(OH)COONa$, (in the following called Na—BON). A clear gel with high elasticity was formed. The gel was tested in the same manner as in Example 1. The results are shown in Table 1.

Example 3

0.60 g of $C_{18}$-betaine ($C_{18}$-BET was first dissolved in 1 ml isopropanol and then mixed with 200 ml of 7.0 wt % of aqueous KCl solution. The resulting solution was mixed with 0.098 g of Na—BON. A clear gel with high elasticity was formed. The gel was tested in the same manner as in Example 1. The results are shown in Table 1.

Example 4

0.50 g $C_{18}$-BET was dissolved in 200 ml of 7. wt % of aqueous KCl solution at 40 C and then mixed with 0.7 g of sodium xylene sulfonate (in the following called Na—XS). A clear gel with high elasticity was formed. The gel was cooled to room temperature. The gel was tested in the same manner as in Example 1. The results are shown in Table 1.

Example 5

200 ml of gel with the composition specified in Example 4 was first subjected to saturation of $CO_2$ and then tested in the same manner as in Example 1. No significant changes in viscosity and foam properties were observed.

Example 6

200 ml of gel with the composition specified in Example 4 was first subjected to saturation of $N_2$ and then tested in the same manner as in Example 1. No significant changes in viscosity and foam properties were observed.

TABLE 1

| Composition (approximate gel (cp) % by weight) | Viscosity of base (ml) | Foam height (min) | Foam Half-Life |
|---|---|---|---|
| (1)<br>0.25 $C_{16}$-BET<br>0.075 Na-LAS<br>0.2 IPA<br>balance water | 35 | 600 | 22 |
| (2)<br>0.25 $C_{16}$-BET<br>0.049 Na-BON<br>0.2 IPA<br>7 KCl<br>balance of water | 250 | 400 | 70 |

TABLE 1-continued

| Composition (approximate gel (cp) % by weight) | Viscosity of base (ml) | Foam height (min) | Foam Half-Life |
|---|---|---|---|
| (3) 0.30 $C_{18}$-BET 0.049 Na-BON 0.5 IPA 7 KCl balance of water | 350 | 300 | 7 |
| (4) 0.40 $C_{18}$-BET 0.25 Na-XS 7 KCl balance of water | 285 | 620 | 45 |

From the results for the above examples, it is evident that $C_{16}$-betaine and $C_{18}$-betaine in combination with an organic salt electrolyte has good foaming capability and can be used for foam fracturing applications.

Example 7

1.0 g of $C_{18}$-BET was dissolved in 0.4 ml of IPA, and then mixed with 200 ml of 7.0% wt % of aqueous KCL solution. The resulting solution was mixed with 0.17 g of Na-LAS. A clear gel with high elasticity was formed. The viscosity of the gel was tested in the manner described above, and the results are listed in Table 2.

Example 8

0.75 g of $C_{16}$-BET was dissolved in 0.4 ml of IPA, and then mixed with 200 ml of 7.0 wt % of aqueous KCl solution. The resulting solution was mixed with 0.27 of Na—BON in NaOH solution. A clear gel with high elasticity was formed. The gel was tested in the same manner as in Example 7. The results are shown in Table 2.

Example 9

0.50 g of $C_{18}$-BET was first dissolved in 0.5 ml IPA and then mixed with 200 ml of 7.0 wt % of aqueous KCl solution at 40 C. The resulting solution was mixed with 0.14 g of Na—BON in NaOH solution. A clear gel with high elasticity was formed. The gel was cooled to room temperature and tested in the same manner as in Example 7. The results are shown in Table 2.

Example 10

1.0 g of $C_{18}$-BET was premixed with 0.8 ml of ethylene glycol monobutyl ether (EGMBE), 0.6 g of Na—XS and 0.4 ml of hot water. The resulting mixture was than mixed with 200 ml of 7.0 wt % of aqueous KCl solution at room temperature. A clear elastic gel was formed immediately. The gel was tested in the same manner as in Example 7. The results are shown in Table 2.

Example 11

0.75 g of $C_{18}$-BET was premixed with 0.8 ml of EGMBE, 0.6 g of Na—XS and 0.4 ml of hot water. The resulting mixture was then mixed with 200 ml of 7.0 wt % of aqueous KCl solution at room temperature. A clear elastic gel was formed immediately. The gel was tested in the same manner in Example 7. The results are shown in Table 2.

TABLE 2

| Compositions (approximate % by weight) | Viscosity of gels (cp) |
|---|---|
| (7) 0.5 $C_{18}$-BET 0.85 Na-LAS 0.20 IPA 7.0 KCL balance of water | 240 |
| (8) 0.38 $C_{16}$-BET 0.14 Na-BON 0.2 IPA 7.00 KCl balance of water | 1050 |
| (9) 0.25 $C_{18}$-BET 0.070 Na-BON 0.50 IPA 7.00 KCl balance of water | 300 |
| (10) 0.50 $C_{18}$-BET 0.30 Na-XS 0.40 EGMBE 7.00 KCl balance of water | 855 |
| (11) 0.38 $C_{18}$-BET 0.30 Na-XS 0.40 EGMBE 7.00 KCl balance of water | 570 |

Example 12

200 ml of gel with the composition specified in Table 2 for Example 10 was first subjected to saturation with $CO_2$ and then tested in the manner described above. No significant changes in viscosity and foam properties were observed.

Example 13

200 ml of gel with the composition specified in Table 2 for Example 10 was first subjected to saturation with $N_2$ and then tested in the manner described above. No significant changes in viscosity and foam properties were observed.

From the results of testing set out in Table 2 it is evident that combinations of a betaine surfactant and an organic electrolyte in the aqueous medium form clear gels with good visoelastic properties. These gels can be used for hydraulic fracturing applications. For applications requiring higher viscosity, higher surfactant loading is generally required.

The foaming properties of the surfactant and organic alcohol compositions according to the present invention were tested by a simple method involving the measuring the viscosity of the gel.

Example 14

1.5 g active substance of octadecyl dimethyl betaine (in the following called C18-betaine) was first dissolved in 200 ml of 5 wt % KCl aqueous solution. The resulting surfactant solution was mixed with 0.8 g of hexadecanol at 55° C. A clear gel with high elasticity was formed. the viscosity of the gel was measured using a Brookfield viscometer (Model LVT, Spindle 1 at 12 rpm) at 55° C. The results are listed in Table 3.

Example 15

1.5 g of C18-betaine was first dissolved in 200 ml of 5 wt % KCl aqueous solution. The resulting surfactant solution was mixed with 0.6 g of tetradecanol at 40° C. A clear gel with high elasticity was formed. The viscosity of the gel was measured suing a Brookfield viscometer (Model LVT, Spindle 1 at 12 rpm) at 40° C. The results are listed in Table 3.

Example 16

1.5 g of C18-betaine was first dissolved in 200 ml of 5 wt % KCl aqueous solution. The resulting surfactant solution was mixed with 0.2 g of decanol at 30° C. A clear gel with high elasticity was formed. The viscosity of the gel was measured using a Brookfield viscometer (Model LVT, Spindle 1 at 12 rpm) at 30° C. The results are shown in Table 3.

Example 17

1.0 g of C18-betaine was first dissolved in 200 ml of 5 wt % KCl aqueous solution. The resulting surfactant solution was mixed with 0.5 g of benzyl alcohol at 22° C. A clear gel with high elasticity was formed. The viscosity of the gel was measured using a Brookfield viscometer (Model LVT, Spindle 1 at 12 rpm) at 22° C. The results are shown in Table 3.

Example 18

1.5 of C16-betaine was first dissolved in 200 ml of 5 wt % KCl aqueous solution. The resulting surfactant solution was mixed with 0.6 g of benzyl alcohol at 22° C. A clear gel with high elasticity was formed. The viscosity of the gel was measured using a Brookfield viscometer (Model LVT, Speindle 1 at 12 rpm) at 22° C. The results are shown in Table 3.

TABLE 3

| | Compositions | | Viscosity of gels |
|---|---|---|---|
| 1. | C18-Betaine | 0.78% | 340 cp |
| | Hexadecanol | 0.4% | |
| | KCl | 5.0% | |
| 2. | C18-Betaine | 0.75% | 470 cp |
| | Tetradecanol | 0.3% | |
| | KCl | 5.0% | |
| 3 | C18-Betaine | 0.75% | 750 cp |
| | Decanol | 0.1% | |
| | KCl | 5.0% | |
| 4. | C18-Betaine | 0.5% | 660 cp |
| | Benzyl alcohol | 0.25% | |
| | KCl | 5.0% | |
| 5. | C16-Betaine | 0.75% | 220 cp |
| | Benzyl alcohol | 0.3% | |
| | KCl | 5.0% | |

From the results of testing set out in Table 3 it is evident that combinations of a betaine surfactant and an organic electrolyte in the aqueous medium form clear gels with good visoelastic properties. These gels can be used for hydraulic fracturing applications. For applications requiring higher viscosity, higher surfactant loading is generally required. The present fluid may also contain a gas, for example $N_2$ or $CO_2$, and thereby be in the form of foams or energized fluids. In other words, the present fluid may also be utilized as a foamed water-based fracturing fluid in the presence of gas.

The embodiments of the invention in which an exclusive property or privilege is claimed are defined as follows:

1. A method of fracturing a subterranean formation comprising the step of injecting a visoelastic surfactant based fracturing fluid into the formation at a pressure sufficient to initiate fracturing, said fluid consisting of a) an aqueous medium,
b) a betaine surfactant having the general formula

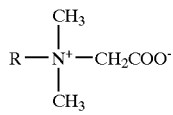

wherein R is an alkyl, alkylene or acyl group containing 16–24 carbon atoms and c) a compound selected from the group consisting of dodecyl benzene sulphonate salt, hexadecylbenzene sulphonate salt, xylene sulphonate salt; cumene sulphonate salt; hexa-diphenyl oxide disulfonate salt, decyl diphenyl oxide disulfonate salt, decanol, dodecanol, tetradecanol, hexadecanol and benzyl alcohol.

2. A method of fracturing according to the method of claim 1, wherein R is an alkyl group having 16–24 carbon atoms.

3. A method of fracturing according to the method of claim 1, wherein R is an alkylene group having 16–24 carbon atoms and 102 double bonds.

4. A method of fracturing according to the method of claim 1, wherein R is an acyl group having 16–24 carbon atoms.

5. A method of fracturing according to the method of claim 1, wherein the concentration of the betaine surfactant is in the range of 0.1–6.0% by weight of the said fluid.

6. A method of fracturing according to the method of claim 1, wherein said betaine surfactant is selected from the group consisting of erucyl dimethyl betaine, docosyl dimethyl betaine, octadecyl dimethyl betaine, hexadecyl dimethyl betaine, and tallow dimenthyl betaine.

7. A method of fracturing according to the method of claim 1, wherein said betaine surfactant is hexadecyl dimethyl betaine and said compound (c) is dodecyl benzene sulphonate salt.

8. A method of fracturing according to the method of claim 1, wherein said betaine surfactant is hexadecyl dimethyl betaine and said compound (c) is cumene sulphonate salt.

9. A method of fracturing according to the method of claim 1, wherein said betaine surfactant is hexadecyl dimethyl betaine and said compound (c) is xylene sulphonate salt.

10. A method of fracturing according to the method of claim 1, wherein said betaine surfactant is hexadecyl dimethyl betaine and said compound (c) is hexa-diphenyl oxide disulfonate salt.

11. A method of fracturing according to the method of claim 1, wherein said betaine surfactant is hexadecyl dimethyl betaine and said compound (c) is decyl diphenyl oxide disulfonate salt.

12. A method of fracturing according to the method of claim 1, wherein said betaine surfactant is octadecyl dimethyl betaine and said compound (c) is dodecyl benzene sulphonate salt.

13. A method of fracturing according to the method of claim 1, wherein said betaine surfactant is octadecyl dimethyl betaine and said compound (c) is cumene sulphonate salt.

14. A method of fracturing according to the method of claim 1, wherein said betaine surfactant is octadecyl dimethyl betaine and said compound (c) is xylene sulphonate salt.

15. A method of fracturing according to the method of claim 1, wherein said betaine surfactant is octadecyl dimethyl betaine and said compound (c) is hexa-diphenyl oxide disulfonate salt.

16. A method of fracturing according to the method of claim 1, wherein said betaine surfactant is octadecyl dimethyl betaine and said compound (c) is decyl diphenyl oxide disulfonate salt.

17. A method of fracturing according to the method of claim 1, wherein said betaine surfactant is hexadecyl dimethyl betaine and said compound (c) is decanol.

18. A method of fracturing according to the method of claim 1, wherein said betaine surfactant is hexadecyl dimethyl betaine and said compound (c) is benzyl alcohol.

19. A method of fracturing according to the method of claim 1, wherein said betaine surfactant is hexadecyl dimethyl betaine and said compound (c) is hexadecanol.

20. A method of fracturing according to the method of claim 1, wherein said betaine surfactant is hexadecyl dimethyl betaine and said compound (c) is tetradecanol.

21. A method of fracturing according to the method of claim 1, wherein said betaine surfactant is octadecyl dimethyl betaine and said compound (c) is decanol.

22. A method of fracturing according to the method of claim 1, wherein said betaine surfactant is octadecyl dimethyl betaine and said compound (c) is tetradecanol.

23. A method of fracturing according to the method of claim 1, wherein said betaine surfactant is octadecyl dimethyl betaine and said compound (c) is benzyl alcohol.

24. A method of fracturing according to the method of claim 1, wherein said betaine surfactant is octadecyl dimethyl betaine and said compound (c) is hexadecanol.

25. A method of fracturing according to the method of claim 1, wherein said fracturing fluid further includes $N_2$ and $CO_2$.

26. A method of fracturing according to the method of claim 1, wherein said fracturing fluid further includes a particulate material suspended therein.

* * * * *